Patented Feb. 5, 1946

2,394,114

UNITED STATES PATENT OFFICE 2,394,114

TRISAZO DIPHENYL DYESTUFFS

Arthur Siebert, Frankfort-on-the-Main, Germany, assignor to General Aniline & Film Corporation, New York, N. Y., a corporation of Delaware No Drawing. Application April 24, 1941, Serial No. 390,105. In Germany May 15, 1940

4 Claims. (Cl. 260—172)

The present invention relates to azo-dyestuffs soluble in water; more particularly it relates to dyestuffs of the following general formula:

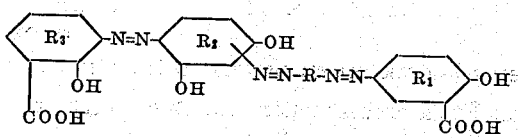

wherein R represents a radical of the diphenyl series, the azo-groups standing in p-position to the diphenyl linkage, and wherein the benzene nuclei $R_1$, $R_2$ and $R_3$ may contain further substituents.

I have found that very valuable azo-dyestuffs capable of being metallized are obtained by coupling 1 mol of the tetrazo-compound from 4.4'-diaminodiphenyl or the substitution products thereof with 1 mol of 1-hydroxybenzene-2-carboxylic acid or the nuclear substitution products thereof capable of being coupled and 1 mol of 1.3-dihydroxybenzene or the substitution products thereof capable of being coupled twice and combining the dyestuff thus obtained with 1 mol of a diazo-compound containing a hydroxyl group and a carboxyl group in ortho-position to each other.

The same dyestuffs are obtained by combining 1 mol of a tetrazotized 4.4'-diaminodiphenyl with 1 mol of 1-hydroxybenzene-2-carboxylic acid or the nuclear substitution products thereof capable of being coupled and 1 mol of a monoazo-dyestuffs of the general constitution:

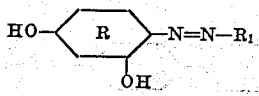

wherein $R_1$ means an aromatic radical containing a hydroxyl group and a carboxyl group in ortho-position to each other and the nucleus R may contain further substituents.

The dyeings produced with these dyestuffs, for instance, on cotton change by an after-treatment with agents yielding metal, especially with copper salts, to brown shades which are distinguished by very good fastness to washing and to light.

The following examples serve to illustrate the invention, but they are not intended to limit it thereto, the parts being by weight, unless otherwise stated.

1. 18.4 parts of 4.4'-diaminodiphenyl are suspended in 500 parts by volume of water and 50 parts by volume of crude hydrochloric acid and tetrazotized at 10° C. The clear tetrazo solution is caused to run at 0° C. to 5° C. into a solution of 15 parts of 1-hydroxybenzene-2-carboxylic acid in 300 parts by volume of 2N-sodium carbonate solution. As soon as a tetrazo-compound can no longer be detected, the diazo-azo compound which has separated is combined with a solution, rendered alkaline by means of sodium carbonate, of 35.4 parts of the monoazo-dyestuff obtained by coupling diazotized 1-amino-2-hydroxybenzene-3-carboxylic acid-5-sulfonic acid with 1.3-dihydroxybenzene, corresponding with the following formula:

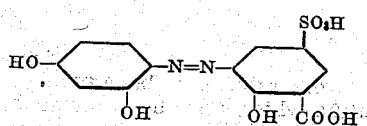

When the coupling is finished the trisazo-dyestuff formed is precipitated with sodium chloride and isolated by filtration. When dry it is a dark brown powder which dissolves in water to a brown solution and dyes cotton brown shades the fastness properties of which are improved by an after-treatment with copper sulfate. The dyestuff corresponds with the following formula:

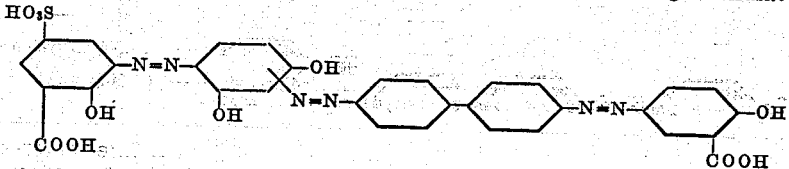

2. If in Example 1 the 18.4 parts of 4.4'-diaminodiphenyl are replaced by 24.4 parts of 4.4'-diamino-3.3'-dimethoxydiphenyl, a redder brown shade on cotton is obtained the fastness properties of which are considerably improved by an after-treatment with copper sulfate.

3. 24.4 parts of 4.4'-diamino-3.3'-dimethoxydiphenyl are suspended in 500 parts by volume of water and 50 parts by volume of crude hydrochloric acid and tetrazotized at 10° C. The clear tetrazo solution is caused to run at 0° C. to 5° C. into a solution of 15 parts of 1-hydroxybenzene-2-carboxylic acid in 300 parts by volume of 2N-sodium carbonate solution. After about 15 hours a tetrazo-compound can at ordinary temperature no longer be detected. The diazoazo-compound which has separated may be filtered with suction. It is suspended in water and coupled with a solution, rendered alkaline by addition of sodium carbonate, of 11 grams of 1.3-dihydroxy-benzene so as to form the disazo-dyestuff. The disazo-dyestuff is combined in a solution rendered alkaline by means of sodium carbonate or caustic alkali, if necessary with addition of pyridine, with 23.3 grams of diazotized 1-amino-2-hydroxy-benzene-3-carboxylic acid-5-sulfonic acid so as to form the trisazo-dyestuff which dyes cotton red-brown shades and has properties very similar to those of the dyestuff described in Example 2.

4. By coupling 1 mol of tetrazotized 4.4'-diamino-3.3'-dimethyldiphenyl with 1 mol of 1-methyl-2-hydroxybenzene-3-carboxylic acid and combining the diazo-azo compound thus obtained with 1 mol of the monoazo-dyestuff of the following constitution:

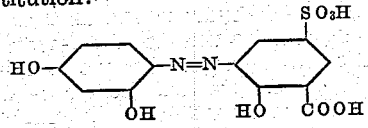

a product is obtained which is very similar to the dyestuff described in Example 1.

The following table describes a number of other azo-dyestuffs which may be obtained according to the present invention and have similar properties:

| | Constitution of the dyestuff— | Shade of the dyeing treated with a copper salt |
|---|---|---|
| 1 | 1-hydroxybenzene-2-carboxylic acid ←— 4.4'-diamino-3.3'-dichloro-diphenyl —→ 1.3-dihydroxybenzene ←— 1-amino-2-hydroxybenzene-3-carboxylic acid-5-sulfonic acid. | Reddish brown. |
| 2 | 1-hydroxybenzene-2-carboxylic acid ←— 4.4'-diamino-2-nitrodiphenyl —→ 1.3-dihydroxybenzene ←— 1-amino-2-hydroxybenzene-3-carboxylic acid-5-sulfonic acid. | Yellowish brown. |
| 3 | 1-hydroxybenzene-2-carboxylic acid ←— 4.4'-diaminodiphenyl-3-sulfonic acid —→ 1.3-dihydroxybenzene ←— 1-amino-2-hydroxybenzene-3-carboxylic acid-5-sulfonic acid. | Reddish brown. |
| 4 | 1-hydroxybenzene-2-carboxylic acid ←— 4.4'-diaminodiphenyl —→ 1.3-dihydroxy-2-methylbenzene ←— 1-amino-2-hydroxybenzene-3-carboxylic acid-5-sulfonic acid. | Brown. |
| 5 | 1-hydroxybenzene-2-carboxylic acid ←— 4.4'-diaminodiphenyl —→ 1.3-dihydroxybenzene-4-carboxylic acid ←— 1-amino-2-hydroxybenzene-3-carboxylic acid-5-sulfonic acid. | Reddish brown. |

I claim:
1. The water-soluble azo-dyestuffs of the following general formula:

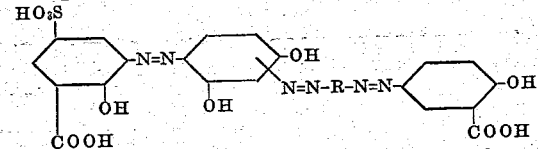

wherein R represents a radical of the diphenyl series, the azo-groups standing in p-position to the diphenyl linkage, being dark brown powders and yielding on cotton dyeings which, when aftertreated with copper salts, change to brown shades of very good fastness to washing and to light.

2. The water-soluble azo-dyestuff of the following formula:

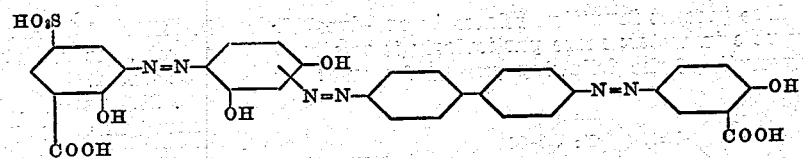

being a dark brown powder which dissolves in water to a brown solution and dyes cotton brown shades whose fastness properties are improved by after-treatment with copper sulfate.

3. The water-soluble azo-dyestuff of the following formula:

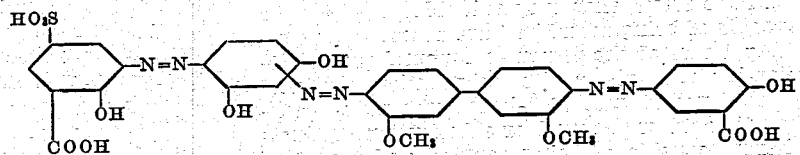

being a dark brown powder which dissolves in water to a brown solution and dyes cotton reddish brown shades whose fastness properties are improved by after-treatment with copper sulfate.

4. The water-soluble azo-dyestuff of the following formula:

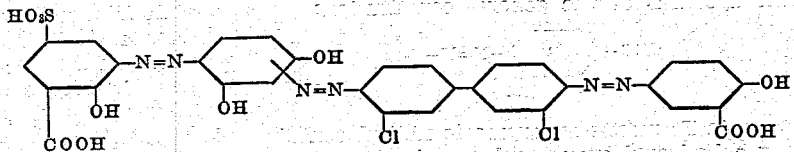

being a dark brown powder which dissolves in water to a brown solution and dyes cotton reddish brown shades whose fastness properties are improved by after-treatment with copper sulfate.

ARTHUR SIEBERT.